(12) United States Patent
Chen et al.

(10) Patent No.: US 12,472,115 B2
(45) Date of Patent: Nov. 18, 2025

(54) SYSTEMS AND METHODS FOR CONTROLLING MEDICAL DEVICES

(71) Applicant: SHANGHAI UNITED IMAGING HEALTHCARE CO., LTD., Shanghai (CN)

(72) Inventors: Wensong Chen, Shanghai (CN); Yunxing Cai, Shanghai (CN); Huiwen Guo, Shanghai (CN); Xiaofen Zhao, Shanghai (CN); Pei Zhou, Shanghai (CN); Xiaoming Wu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 658 days.

(21) Appl. No.: 17/808,531

(22) Filed: Jun. 23, 2022

(65) Prior Publication Data

US 2022/0331178 A1 Oct. 20, 2022

Related U.S. Application Data

(63) Continuation of application No. PCT/CN2020/138726, filed on Dec. 23, 2020.

(30) Foreign Application Priority Data

Dec. 23, 2019 (CN) .......................... 201911338370.5

(51) Int. Cl.
*A61G 7/018* (2006.01)
*A61G 7/10* (2006.01)
(Continued)

(52) U.S. Cl.
CPC ........... *A61G 7/018* (2013.01); *A61G 7/1073* (2013.01); *G06F 3/04817* (2013.01);
(Continued)

(58) Field of Classification Search
CPC .. A61G 7/018; A61G 7/1073; A61G 2203/16; A61G 2203/20; G06F 3/04817; G06F 3/0488
See application file for complete search history.

(56) References Cited

U.S. PATENT DOCUMENTS 10,642,484 B1 * 5/2020 Hanada ............... G06F 3/04817
11,354,033 B2 * 6/2022 Zambetti ............. G06F 3/04847
(Continued)

FOREIGN PATENT DOCUMENTS

CN 1931094 A 3/2007
CN 103809888 A 5/2014
(Continued)

OTHER PUBLICATIONS

Partial Supplementary European Search Report in European Application No. 20904665.5 mailed on Dec. 19, 2022, 10 pages.
(Continued)

*Primary Examiner* — John A Tweel, Jr.
(74) *Attorney, Agent, or Firm* — METIS IP LLC

(57) ABSTRACT

The present disclosure is related to systems and methods for controlling a patient bed of a medical device. A method includes determining whether a first gesture on the touch panel satisfies a first trigger condition; in response to determining that the first gesture satisfies the first trigger condition, generating instructions for causing at least one icon to be displayed on the touch panel, the at least one icon being configured to control the movement of the patient bed; and determining at least one movement parameter of the patient bed based at least on a second gesture directed to the at least one icon.

20 Claims, 10 Drawing Sheets

(51) Int. Cl.
*G06F 3/04817* (2022.01)
*G06F 3/0488* (2022.01)

(52) U.S. Cl.
CPC ........ *G06F 3/0488* (2013.01); *A61G 2203/16* (2013.01); *A61G 2203/20* (2013.01)

(56) References Cited

U.S. PATENT DOCUMENTS

| | | | |
|---|---|---|---|
| 11,714,543 B2* | 8/2023 | Morris | H04N 7/147 715/750 |
| 11,983,399 B2* | 5/2024 | Ogbevoen | G06F 3/03547 |
| 2009/0165627 A1 | 7/2009 | Walter | |
| 2012/0284674 A1 | 11/2012 | Geng et al. | |
| 2015/0317068 A1 | 11/2015 | Marka et al. | |
| 2016/0232314 A1 | 8/2016 | Hsieh et al. | |
| 2019/0317622 A1 | 10/2019 | Leigh et al. | |
| 2022/0197486 A1 | 6/2022 | Xiong | |

FOREIGN PATENT DOCUMENTS

| | | |
|---|---|---|
| CN | 109260612 A | 1/2019 |
| CN | 110333780 A | 10/2019 |
| WO | 2019193057 A1 | 10/2019 |
| WO | 2021129686 A1 | 7/2021 |

OTHER PUBLICATIONS

International Search Report in PCT/CN2020/138726 mailed on Mar. 17, 2021, 4 pages.
Written Opinion in PCT/CN2020/138726 mailed on Mar. 17, 2021, 5 pages.
First Office Action in Chinese Application No. 201911338370.5 mailed on Feb. 1, 2021, 14 pages.
The Third Office Action in Chinese Application No. 201911338370.5 mailed on Jan. 5, 2022, 8 pages.

* cited by examiner

600

```
┌─────────────────────────────────────────────────┐
│ Determining whether a touch gesture (or referred to as │
│ a first touch gesture) that relates to a movement      │──── 602
│ operation on a touch panel satisfies a movement trigger│
│ condition (or referred to a first trigger condition)   │
└─────────────────────────────────────────────────┘
                          │
                          ▼
┌─────────────────────────────────────────────────┐
│ In response to determining that the first touch gesture│
│ satisfies the first trigger condition, generating,     │──── 604
│ instructions for causing at least one icon to be       │
│ displayed on the touch panel, the at least one icon    │
│ being configured to control the movement of the patient│
│ bed                                                    │
└─────────────────────────────────────────────────┘
                          │
                          ▼
┌─────────────────────────────────────────────────┐
│ Determining at least one movement parameter of the     │──── 606
│ patient bed based at least on a second touch gesture   │
│ directed to the at least one icon                      │
└─────────────────────────────────────────────────┘
```

```
Determining whether a third touch gesture on a touch      ~ 902
panel satisfies a second trigger condition for operating
a medical device
                      ↓
In response to determining that the third touch gesture   ~ 904
satisfies the second trigger condition, determining at
least one control parameter of the medical device
based at least on the third touch gesture
```

```
Generating instructions for causing at least one second
icon to be displayed on the touch panel, the at least     ~ 1002
one second icon being configured to control the
medical device
                      ↓
Determining at least one control parameter of the
medical device based on the third touch gesture and a     ~ 1004
fourth touch gesture directed at the at least one second
icon, wherein the third touch gesture and the fourth
touch gesture are detected by the touch panel
simultaneously
```

FIG. 10

SYSTEMS AND METHODS FOR CONTROLLING MEDICAL DEVICES

CROSS-REFERENCE TO RELATED APPLICATIONS

This application is a Continuation of International Application No. PCT/CN2020/138726, filed on Dec. 23, 2020, which claims priority of Chinese Patent Application No. 201911338370.5 filed on Dec. 23, 2019, the contents of which are hereby incorporated by reference.

TECHNICAL FIELD

This disclosure generally relates to medical devices, and more particularly, relates to systems and methods for controlling medical devices.

BACKGROUND

Existing medical devices (e.g., an X-ray imaging device, a radiotherapy (RT) system, etc.) are often controlled via physical buttons to ensure safety and reliability of the medical devices. For example, movements of a patient bed of a medical device are usually controlled via physical buttons. As another example, a radiation source of a medical device is controlled via physical buttons for controlling radiation exposure of the medical device. However, physical buttons are easily stuck due to frequent uses or mistakenly activated by an object (e.g., a part of an operator), which brings safety concerns for a patient, an operator, and/or a medical device. Therefore, it is desirable to provide systems and methods for controlling medical devices to overcome the deficiencies of physical buttons and achieve safe and reliable control of the medical devices.

SUMMARY

According to an aspect of the present disclosure, a system for controlling a movement of a patient bed using a touch panel is provided. The system may include at least one storage device including a set of instructions and at least one processor in communication with the patient bed, the touch panel, and the at least one storage device. When executing the set of instructions, the at least one processor may be directed to cause the system to perform operations. The operations may include determining whether a first gesture on the touch panel satisfies a first trigger condition; in response to the determining that the first gesture satisfies the first trigger condition, generating instructions for causing at least one icon to be displayed on the touch panel, the at least one icon being configured to control the movement of the patient bed; and determining at least one movement parameter of the patient bed based at least on a second gesture directed to the at least one icon.

In some embodiments, the at least one movement parameter may include at least one of a movement direction, a movement speed, or a target position of the patient bed.

In some embodiments, the movement speed may relate to a distance between the second gesture and an edge of the touch panel.

In some embodiments, the first trigger condition may include a position of the first gesture on the touch panel being within a predetermined region of the touch panel.

In some embodiments, the first trigger condition may include a duration of the first gesture on the touch panel exceeding a duration threshold.

In some embodiments, the determining the at least one movement parameter of the patient bed based at least on the second gesture may include determining the at least one movement parameter of the patient bed based on the second gesture.

In some embodiments, the determining the at least one movement parameter of the patient bed based at least on the second gesture may include determining the at least one movement parameter of the patient bed based on the second gesture and the first gesture, wherein the second gesture and the first gesture are detected by the touch panel simultaneously.

In some embodiments, the at least one icon displayed on the touch panel may be at least partially transparent to or spaced apart from other information displayed on the touch panel.

In some embodiments, the patient bed may be included in a medical device, and the operations may further include: determining whether a third gesture on the touch panel satisfies a second trigger condition; and in response to determining that the third gesture satisfies the second trigger condition, determining at least one control parameter of the medical device based at least on the third gesture.

In some embodiments, the at least one control parameter may be configured to control a radiation source of the medical device, and the at least one control parameter may include at least one of: a switch-on of the radiation source, a switch-off of the radiation source, an exposure duration of the radiation source, or an intensity of the radiation source.

In some embodiments, the determining the at least one control parameter of the medical device based at least on the third gesture may include: in response to determining that the third gesture satisfies the second trigger condition, generating instructions for causing at least one second icon to be displayed on the touch panel, the at least one second icon being configured to control the medical device; and determining the at least one control parameter of the medical device based on the third gesture and a fourth gesture directed at the at least one second icon, wherein the third gesture and the fourth gesture are detected by the touch panel simultaneously.

According to another aspect of the present disclosure, a system for controlling a radiation source of a medical device using a touch panel is provided. The system may include at least one storage device including a set of instructions and at least one processor in communication with the patient bed, the touch panel, and the at least one storage device. When executing the set of instructions, the at least one processor may be directed to cause the system to perform operations. The operations may include determining whether a gesture that relates to an exposure operation on the touch panel satisfies an exposure trigger condition; and in response to a determination that the gesture satisfies the exposure trigger condition, determining at least one control parameter of the radiation source based at least on the gesture.

In some embodiments, the at least one control parameter may include at least one of: a switch-on of the radiation source, a switch-off of the radiation source, an exposure duration of the radiation source, or an intensity of the radiation source.

In some embodiments, the determining the at least one control parameter of the radiation source based at least on the gesture may include: in response to determining that the gesture satisfies the exposure trigger condition, generating instructions for causing at least one icon to be displayed on the touch panel, the at least one icon being configured to control the radiation source; and determining the at least one control parameter of the radiation source based on the gesture and a second gesture that relates to the exposure operation directed at the at least one icon, wherein the gesture and the second gesture are detected by the touch panel simultaneously.

In some embodiments, the exposure trigger condition may include: the gesture satisfies a predetermined slide pattern from a predetermined start point to a predetermined destination along a predetermined region.

In some embodiments, the determining the at least one control parameter of the radiation source based at least on the gesture may include: in response to determining that the gesture satisfies the exposure trigger condition, generating a switch-on instruction for switching on the radiation source.

In some embodiments, the determining the at least one control parameter of the radiation source based at least on the gesture may include: in response to determining that the gesture satisfies the exposure trigger condition, generating instructions for causing at least one icon to be displayed on the touch panel, the at least one icon being configured to control the radiation source; and determining the at least one control parameter of the radiation source based on a second gesture that relates to the exposure operation directed at the at least one icon.

In some embodiments, the generating instructions for causing at least one icon to be displayed on the touch panel may include: in response to determining that the gesture satisfies the exposure trigger condition, generating the instructions for causing the at least one icon to be displayed on the touch panel after a predetermined latency.

According to still another aspect of the present disclosure, a method for controlling a movement of a patient bed using a touch panel is provided. The method may include determining whether a first gesture on the touch panel satisfies a first trigger condition; in response to the determining that the first gesture satisfies the first trigger condition, generating instructions for causing at least one icon to be displayed on the touch panel, the at least one icon being configured to control the movement of the patient bed; and determining at least one movement parameter of the patient bed based at least on a second gesture directed to the at least one icon.

According to still another aspect of the present disclosure, a method for controlling a radiation source of a medical device is provided. The method may include determining whether a gesture that relates to an exposure operation on the touch panel satisfies an exposure trigger condition; and in response to a determination that the gesture satisfies the exposure trigger condition, determining at least one control parameter of the radiation source based at least on the gesture.

According to still another aspect of the present disclosure, a non-transitory computer readable medium including at least one set of instructions is provided. When accessed by at least one processor of a system, the at least one set of instructions may cause the system to execute a method. The method may include determining whether a first gesture on the touch panel satisfies a first trigger condition; in response to the determining that the first gesture satisfies the first trigger condition, generating instructions for causing at least one icon to be displayed on the touch panel, the at least one icon being configured to control the movement of the patient bed; and determining at least one movement parameter of the patient bed based at least on a second gesture directed to the at least one icon.

According to still another aspect of the present disclosure, a non-transitory computer readable medium including at least one set of instructions is provided. When accessed by at least one processor of a system, the at least one set of instructions may cause the system to execute a method. The method may include determining whether a gesture that relates to an exposure operation on the touch panel satisfies an exposure trigger condition; and in response to a determination that the gesture satisfies the exposure trigger condition, determining at least one control parameter of the radiation source based at least on the gesture.

According to still another aspect of the present disclosure, a medical system is provided. The medical system may include a medical device comprising a gantry and a patient bed; a touch panel for controlling a movement of the patient bed with respect to the gantry; and at least one processor in communication with the patient bed and the touch panel, in response to the touch panel detecting a first gesture, the at least one processor is directed to cause the medical system to perform operations. The operations may include determining, by the at least one processor, whether the first gesture on the touch panel satisfies a first trigger condition; in response to determining that the first gesture satisfies the first trigger condition, displaying, by the touch panel, at least one icon configured to control the movement of the patient bed; detecting, by the touch panel, a second gesture directed to the at least one icon; and determining, by the at least one processor, at least one movement parameter of the patient bed based at least on the second gesture, wherein the patient bed moves according to the least one movement parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6 is a flowchart illustrating an exemplary process for controlling a movement of a patient bed using a touch panel according to some embodiments of the present disclosure;

FIG. 9 is a flowchart illustrating an exemplary process for controlling a medical device using a touch panel according to some embodiments of the present disclosure;

FIG. 10 is a flowchart illustrating an exemplary process for determining at least one control parameter of a medical device according to some embodiments of the present disclosure;

DETAILED DESCRIPTION

Figure 1:
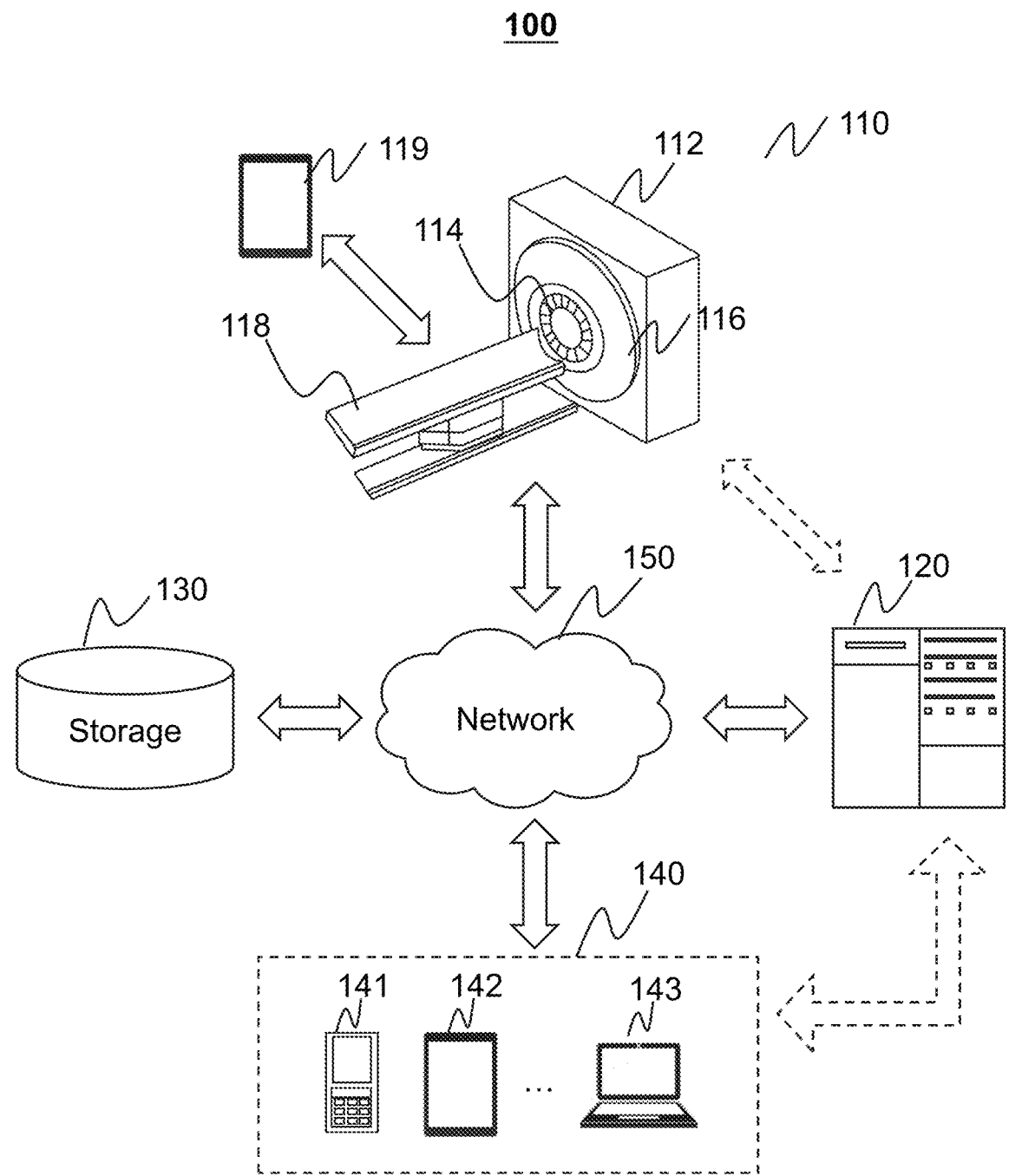
FIG. 1 is a schematic diagram illustrating a medical system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description regarding the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

It will be understood that the terms "gesture," "touch gesture," "action," "body movement," may be used interchangeably in the present disclosure to refer to a control instruction or a control intention sent by an operator of the system, which may be non-contact or contacted to a sensor for detecting them. The control instruction (or the control intention) may also be virtual reality (VR) based. Accordingly, the terms "sensor," "touch panel," may be used interchangeably herein to refer to any sensor that is capable of detecting the control instruction or the control intention sent by the operator. For example, the touch panel may include or be a sensor including, e.g., a camera, a motion sensor, a gyroscope, an accelerometer, a magnetometer, a receiver, etc.

Provided herein are systems and methods for controlling a medical device using a sensor (e.g., a touch panel, a camera, a motion sensor, a gyroscope, an accelerometer, a magnetometer, a receiver, etc.) coupled to the medical device. An aspect of the present disclosure relates to systems and methods for controlling a movement of a patient bed of the medical device. The systems and methods may detect a gesture that relates to a movement operation of a patient bed of the medical device on the touch panel, and determine whether the gesture satisfies a predetermined trigger condition for moving the patient bed. If the predetermined trigger condition for moving the patient bed is satisfied, the systems and methods may generate icon(s) for displaying on the touch panel. The icon(s) may be configured to control the movement of the patient bed. Movement parameter(s) may be determined based on a gesture directed to the displayed icon(s). Alternatively, the movement parameter(s) may be determined when the gesture directed to the displayed icon(s) and the gesture that relates to the movement operation are simultaneously detected. The patient bed may be moved based on the determined movement parameters. Alternatively, the gesture may be a non-contact gesture detected by one or more sensors, such as a camera, a motion sensor, a gyroscope, an accelerometer, a magnetometer, etc.

Another aspect of the present disclosure relates to systems and methods for controlling a radiation source of the medical device using a touch panel. The systems and methods may determine whether a gesture that relates to an exposure operation on the touch panel satisfies an exposure trigger condition. If the exposure trigger condition is satisfied, control parameter(s) of the radiation source may be determined based on the gesture that relates to the exposure operation, and the radiation source may be controlled to work based on the control parameter(s). Alternatively, if the exposure trigger condition is satisfied, icon(s) that is used to control the radiation source may be generated for display on the touch panel, and the control parameter(s) of the radiation source may be determined based on the gesture that relates to the exposure operation and a gesture directed to the displayed icon(s). The two gestures may be detected by the touch panel simultaneously.

According to the present disclosure, the medical device is controlled using a touch panel by setting anti-touch conditions and/or certain trigger conditions. Thus, the deficiencies of the physical buttons may be overcome, thereby improving the safety and/or reliability of the controlling of the medical device.

FIG. 1 is a schematic diagram illustrating an exemplary medical system 100 according to some embodiments of the present disclosure. As shown, the medical system 100 may include a medical device 110, a processing device 120, a storage device 130, one or more terminal(s) 140, and a network 150. In some embodiments, the medical device 110, the processing device 120, the storage device 130, and/or the terminal(s) 140 may be connected to and/or communicate with each other via a wireless connection (e.g., the network 150), a wired connection, or a combination thereof. The connection between the components in the medical system 100 may be variable. Merely by way of example, the medical device 110 may be connected to the processing device 120 through the network 150, as illustrated in FIG. 1. As another example, the medical device 110 may be connected to the processing device 120 directly. As a further example, the storage device 130 may be connected to the processing device 120 through the network 150, as illustrated in FIG. 1, or connected to the processing device 120 directly. As still a further example, the terminal(s) 140 may be connected to the processing device 120 through the network 150, as illustrated in FIG. 1, or connected to the processing device 120 directly.

The medical device 110 may be configured to scan an object using radiation rays to generate one or more images relating to the object or to deliver radiation to the object to treat the object. In some embodiments, the medical device 110 may be a computed tomography (CT) scanner, a suspended X-ray imaging device, a digital radiography (DR) scanner (e.g., a mobile digital X-ray imaging device), a digital subtraction angiography (DSA) scanner, a dynamic spatial reconstruction (DSR) scanner, an X-ray microscopy scanner, a multimodality scanner, a radiotherapy (RT) system, or the like, or a combination thereof. Exemplary multi-modality scanners may include a computed tomography-positron emission tomography (CT-PET) scanner, a computed tomography-magnetic resonance imaging (CT-MRI) scanner, etc. The object may be biological or non-biological. Merely by way of example, the object may include a patient, a man-made object, etc. As another example, the object may include a specific portion, organ, and/or tissue of a patient. For example, the object may include head, brain, neck, body, shoulder, arm, thorax, cardiac, stomach, blood vessel, soft tissue, knee, feet, or the like, or any combination thereof.

In some embodiments, the medical device 110 may include a gantry 112, a detector 114, a radiation source 116, and a patient bed 118. A subject may be placed on the patient bed 118 for scanning or treatment. In some embodiments, the radiation source 116 may generate and/or emit radiation beams travelling toward the object. The radiation may include a particle ray, a photon ray, or the like, or a combination thereof. In some embodiments, the radiation may include a plurality of radiation particles (e.g., neutrons, protons, electron, μ-mesons, heavy ions), a plurality of radiation photons (e.g., X-ray, a γ-ray, ultraviolet, laser), or the like, or a combination thereof. In some embodiments, the detector 114 may detect radiation beams.

In some embodiments, the medical device 110 may further include or otherwise be controlled via a touch panel 119. The touch panel 119 may be configured to receive instructions from an operator of the medical system 100 to control one or more components (e.g., the gantry 112, the detector 114, the radiation source 116, the patient bed 118) of the medical device 110. In some embodiments, the touch panel 119 may be mounted on the medical device 110. For example, the touch panel 119 may be mounted on an external surface of the gantry 112. In some embodiments, the touch panel 119 may be a device external to and communicate with the medical device 110 in a wired manner or wirelessly. For instance, the touch panel 119 may communicate with the medical device 110 via the network 150. For example, the touch panel 119 may be implemented on the terminal(s) 140.

In some embodiments, the medical device 110 may further include or otherwise be controlled via one or more sensors (not shown in FIG. 1). The one or more sensors may be configured to detect actions of an operator of the medical system 100 to control one or more components (e.g., the gantry 112, the detector 114, the radiation source 116, the patient bed 118) of the medical device 110. The one or more sensors may include a camera, a motion sensor, a gyroscope, an accelerometer, a magnetometer, a receiver, or the like, or any combination thereof. For example, two cameras may be respectively mounted on two ends of a patient bed 118. Each of the two cameras may be configured to detect a specific gesture (or a specific action, or a specific body movement, etc.) for controlling the patient bed 118 to move towards a direction. For example, a specific gesture detected by a camera mounted at the head of the patient bed 118 may control the patient bed 118 to move into the gantry 112 (or a direction of entering into the gantry 112). A second gesture (same or different from the first gesture) detected by a camera mounted at the foot of the patient bed 118 may control the patient bed 118 to move out from the gantry 112 (or a negative direction of entering into the gantry 112). As another example, a camera may be mounted anywhere on the patient bed 118. Different gestures may indicate different movement instructions. In some embodiments, a specific gesture and a control function of the specific gesture may be predetermined (or user-defined or machine-learned) and stored in a storage device (e.g., the storage device 130, the storage 220, or the storage 390) of the medical system 100.

As still another example, the one or more sensors may be virtual reality (VR) based device for detecting specific motions from an operator. For example, the one or more sensors may include a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc.

The processing device 120 may process data and/or information obtained from the medical device 110, the storage device 130, and/or the terminal(s) 140, and control the medical device 110. In some embodiments, the processing device 120 may control a device, or a portion thereof, based on 2-layer information from the touch panel 119. In some embodiments, as a first-layer information, the processing device 120 may receive information relating to a gesture directed to the touch panel 119; the processing device 120 may determine, based on the received information, whether the gesture that relates to an operation of the medical device 110, or a portion thereof, satisfies a first trigger condition. Alternatively, the touch panel 119 or a terminal (e.g., the terminal 140) connected to the touch panel 119 may determine whether the gesture satisfies the first trigger condition, and send the determination result to the processing device 120. The processing device 120 may generate at least one icon for controlling the operation of the medical device 110, or a portion thereof, for displaying on the touch panel 119 in response to determining that the gesture satisfies the first trigger condition. The processing device 120 may determine at least one operation parameter of the medical device 110, or a portion thereof, based at least on a further gesture directed to the displayed at least one icon, and cause the medical device 110, or a portion thereof, to perform the operation according to the at least one movement parameter.

For example, the processing device 120 may control a movement of the patient bed 118 based on information from the touch panel 119. The processing device 120 may determine whether a gesture (or referred to as a first gesture) that relates to a movement operation of the patient bed 118 on the touch panel 119 satisfies a trigger condition (or referred to as a first trigger condition) for moving the patient bed. The processing device 120 may generate instructions for causing at least one icon for controlling the movement of the patient bed 118 to be displayed on the touch panel 119 in response to determining that the first gesture satisfies the first trigger condition. The processing device 120 may determine at least one movement parameter of the patient bed 118 based at least on a gesture (or referred to as a second gesture) directed to the displayed at least one icon, and control the patient bed 118 to move according to the at least one movement parameter. As another example, the processing device 120 may control the radiation source 116 of the medical device 110 based on information from the touch panel 119. The processing device 120 may determine whether a gesture (or referred to as a third gesture) that relates to an exposure operation on the touch panel 119 satisfies an exposure trigger condition (or referred to as a second trigger condition). The processing device 120 may determine at least one control parameter for controlling the radiation source 116 based at least on the third gesture in response to determining that the third gesture satisfies the second trigger condition. The processing device 120 may further control the exposure operation of the radiation source 116 according to the at least one control parameter of the radiation source 116.

In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof.

The storage device 130 may store data, instructions, and/or any other information. In some embodiments, the storage device 130 may store data obtained from the medical device 110, the processing device 120, and/or the terminal(s) 140. For example, the storage device 130 may store one or more trigger conditions used to determine whether to trigger the controlling of one or more components of the medical device 110. As another example, the storage device 130 may store one or more control parameters of the one or more components of the medical device 110 determined by the processing device 120. In some embodiments, the storage device 130 may store data and/or instructions that the processing device 120 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform as described elsewhere in the disclosure.

In some embodiments, the storage device 130 may be connected to the network 150 to communicate with one or more other components in the medical system 100 (e.g., the processing device 120, the terminal(s) 140). One or more components in the medical system 100 may access the data or instructions stored in the storage device 130 via the network 150. In some embodiments, the storage device 130 may be part of the processing device 120.

The terminal(s) 140 may be connected to and/or communicate with the medical device 110, the processing device 120, and/or the storage device 130. For example, the terminal(s) 140 may be a terminal including the touch panel 119 and be used to control one or more components of the medical device 110. As another example, the terminal(s) 140 may obtain data acquired by the medical device 110 and transmit the image data to the processing device 120 to be processed. In some embodiments, the terminal(s) 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140, etc.) may communicate information and/or data with one or more other components of the medical system 100 via the network 150. For example, the processing device 120 may obtain image data from the medical device 110 via the network 150. As another example, the processing device 120 may obtain user instruction(s) from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 130 may be a data storage including cloud computing platforms, such as public cloud, private cloud, community, and hybrid clouds, etc. As another example, the processing device 120 and the terminal(s) 140 may be integrated into a console. However, those variations and modifications do not depart the scope of the present disclosure.

Figure 2:
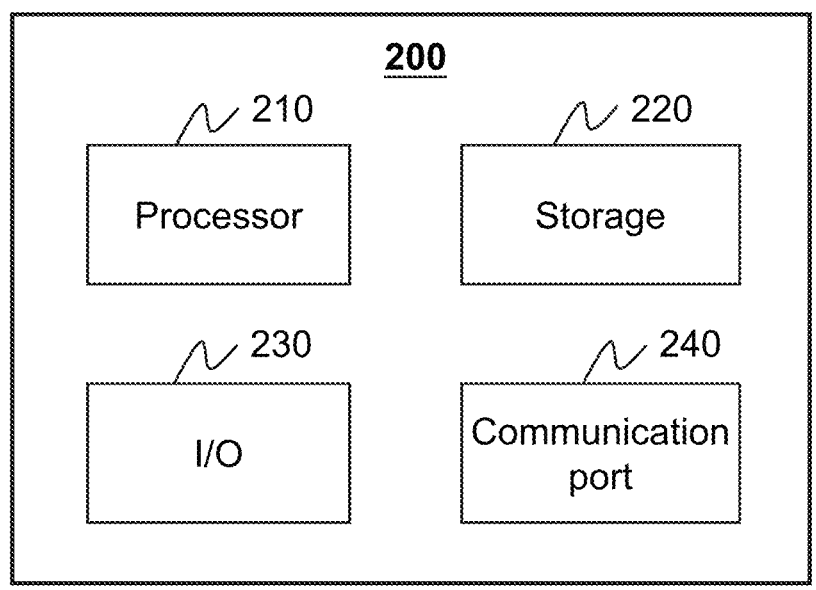
FIG. 2 is a schematic diagram illustrating exemplary hardware and/or software components of a computing device according to some embodiments of the present disclosure.

FIG. 2 is a schematic diagram illustrating hardware and/or software components of an exemplary computing device 200 according to some embodiments of the present disclosure. The computing device 200 may be used to implement any component of the medical system 100 as described herein. For example, the processing device 120, the terminal(s) 140, and/or the touch panel 119 may be implemented on the computing device 200, respectively, via its hardware, software program, firmware, or a combination thereof. Although only one such computing device is shown, for convenience, the computer functions relating to the medical system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may control a device, or a portion thereof, based on 2-layer information from the touch panel 119. In some embodiments, as a first-layer information, the processor 210 may receive information relating to a gesture directed to the touch panel 119; the processor 210 may determine, based on the received information, whether the gesture that relates to an operation of the medical device 110, or a portion thereof, satisfies a first trigger condition. Alternatively, the touch panel 119 or a terminal (e.g., the terminal 140) connected to the touch panel 119 may determine whether the gesture satisfies the first trigger condition, and send the determination result to the processor 210. The processor 210 may generate at least one icon for controlling the operation of the medical device 110, or a portion thereof, for displaying on the touch panel 119 in response to determining that the gesture satisfies the first trigger condition. The processor 210 may determine at least one operation parameter of the medical device 110, or a portion thereof, based at least on a further gesture directed to the displayed at least one icon, and cause the medical device 110, or a portion thereof, to perform the operation according to the at least one movement parameter.

For example, the processor 210 may control a movement of the patient bed 118 based on information from the touch panel 119. The processor 210 may determine whether a gesture (or referred to as a first gesture) that relates to a movement operation of the patient bed 118 on the touch panel 119 satisfies a trigger condition (or referred to as a first trigger condition) for moving the patient bed. The processor 210 may generate instructions for causing at least one icon for controlling the movement of the patient bed 118 to be displayed on the touch panel 119 in response to determining that the first gesture satisfies the first trigger condition. The processor 210 may determine at least one movement parameter of the patient bed 118 based at least on a gesture (or referred to as a second gesture) directed to the displayed at least one icon, and control the patient bed 118 to move according to the at least one movement parameter. As another example, the processor 210 may control the radiation source 116 of the medical device 110 based on information from the touch panel 119. The processor 210 may determine whether a gesture (or referred to as a third gesture) that relates to an exposure operation on the touch panel 119 satisfies an exposure trigger condition (or referred to as a second trigger condition). The processor 210 may determine at least one control parameter for controlling the radiation source 116 based at least on the third gesture in response to determining that the third gesture satisfies the second trigger condition. The processor 210 may further control the exposure operation of the radiation source 116 according to the at least one control parameter of the radiation source 116. In some embodiments, the processor 210 may include one or more hardware processors, such as a microcontroller, a microprocessor, a reduced instruction set computer (RISC), an application-specific integrated circuit (ASIC), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical device 110, the terminal(s) 140, the storage device 130, or any other component of the medical system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the medical device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
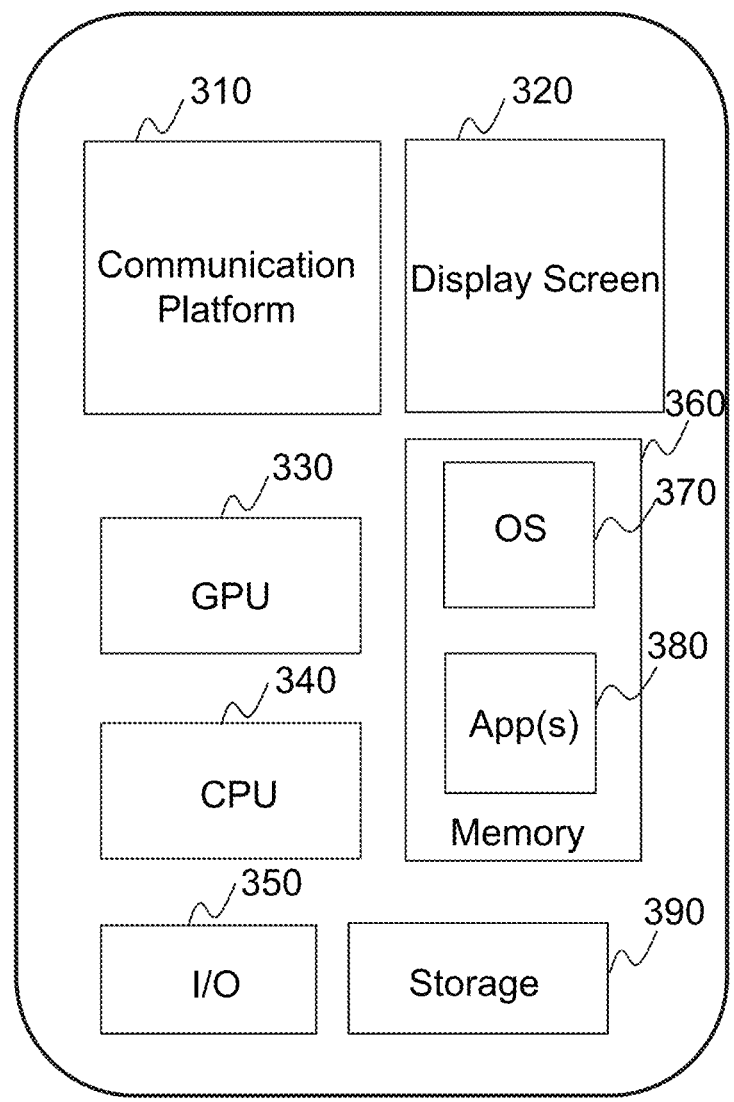
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. In some embodiments, one or more terminals 140, a processing device 120, and/or the touch panel 119 may be implemented on a mobile device 300, respectively.

As illustrated in FIG. 3, the mobile device 300 may include a communication platform 310, a display screen 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 to be executed by the CPU 340. The applications 380 may include a browser or any other suitable mobile apps for receiving and rendering information relating to image data acquisition or other information from the processing device 120. User interactions with the information stream may be achieved via the I/O 350 and provided to the processing device 120 and/or other components of the medical system 100 via the network 150.

To implement various modules, units, and functionalities described in the present disclosure, computer hardware platforms may be used as the hardware platform(s) for one or more of the elements described herein. The hardware elements, operating systems and programming languages of such computers are conventional, and it is presumed that those skilled in the art are adequately familiar therewith to adapt those technologies for image data acquisition as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 4:
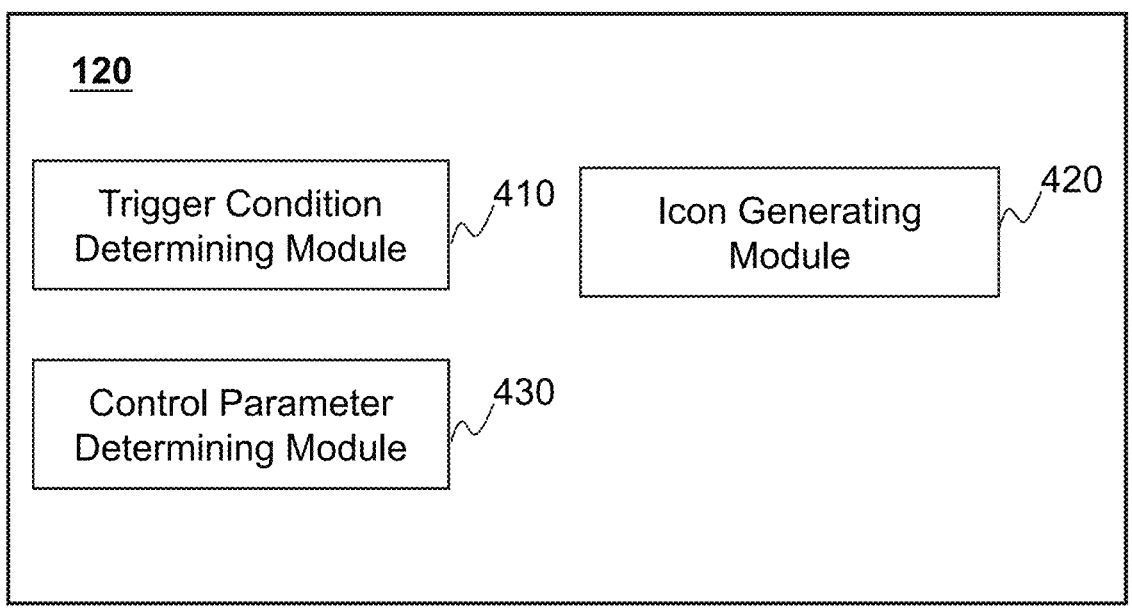
FIG. 4 is a schematic diagram illustrating an exemplary processing device according to some embodiments of the present disclosure.

FIG. 4 is a block diagram illustrating an exemplary processing device 120 according to some embodiments of the present disclosure. In some embodiments, the processing device 120 may be implemented on a processing unit (e.g., the processor 210 illustrated in FIG. 2 or the CPU 340 as illustrated in FIG. 3). As shown in FIG. 4, the processing device 120 may include a trigger condition determining module 410, an icon generating module 420, and a control parameter determining module 430.

The trigger condition determining module 410 may be configured to determine whether a trigger condition for operating one or more components of a medical device (e.g., the medical device 110) is satisfied or receives information regarding the determination from a touch panel (e.g., the touch panel 119) or a terminal (e.g., the terminal 140) connected to the touch panel. In some embodiments, the trigger condition may include a movement trigger condition (or referred to a first trigger condition) for a movement operation of a patient bed (e.g., the patient bed 118), an exposure trigger condition for controlling an exposure operation of a radiation source (e.g., the radiation source 116), a rotation trigger condition for controlling a rotation of a gantry (e.g., the gantry 112), or the like, or any combination thereof.

The icon generating module 420 may be configured to generate instructions for causing one or more icons to be displayed on the touch panel. For example, in response to determining that the trigger condition is satisfied, the icon generating module 420 may be configured to generate instructions for causing one or more icons to be displayed on the touch panel. In some embodiments, the at least one icon may be configured to control the one or more components of the medical device 110. For example, the at least one icon may be configured to control the movement of the patient bed (e.g., the patient bed 118), the radiation source 116 of the medical device 110, the gantry 112 of the medical device 110, or the like, or any combination thereof.

The control parameter determining module 430 may be configured to determine at least one control parameter of the medical device 110. For example, the control parameter determining module 430 may determine the at least one control parameter based at least on a gesture (or referred to as a second gesture) directed to the at least one icon. In some embodiments, the at least one control parameter may be configured to control the one or more components of the medical device 110. For example, the at least one control parameter may include a movement parameter for controlling a movement of the patient bed 118, a control parameter for controlling exposure of the radiation source 116, a control parameter for controlling the rotation of the gantry 112, a control parameter for controlling the detector 114, or the like, or any combination thereof.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. Each of the modules described above may be a hardware circuit that is designed to perform certain actions, e.g., according to a set of instructions stored in one or more storage media, and/or any combination of the hardware circuit and the one or more storage media. For example, the control parameter determining module 430 may include a plurality of units, each of which is configured to determine the movement parameter, the control parameter, the control parameter for controlling the rotation of the gantry 112, and the control parameter for controlling the detector 114.

Figure 5:
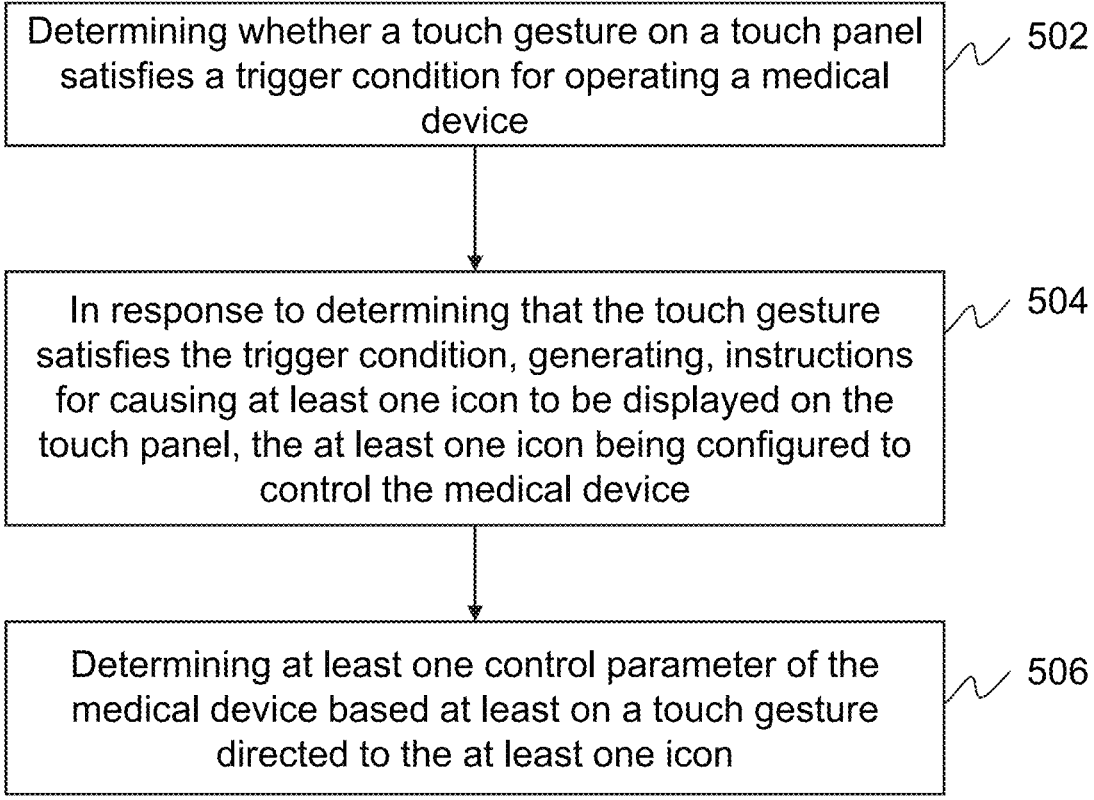
FIG. 5 is a flowchart illustrating an exemplary process for controlling a medical device using a touch panel according to some embodiments of the present disclosure.

FIG. 5 is a flowchart illustrating an exemplary process 500 for controlling a medical device using a touch panel according to some embodiments of the present disclosure. In some embodiments, the process 500 may be implemented as a set of instructions (e.g., an application) stored in the storage device 130, the storage 220, or the storage 390. The processing device 120, the processor 210, and/or the CPU 340 may execute the set of instructions, and when executing the instructions, the processing device 120, the processor 210, and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In 502, a determination may be made as to whether a gesture (or referred to as a first gesture) on a touch panel (e.g., the touch panel 119) satisfies a trigger condition for operating the medical device 110. In some embodiments, the determination may be made by the processing device 120 (e.g., the trigger condition determining module 410). In some embodiments, the determination may be made by the terminal 140 or the touch panel 119, and information regarding the determination may be transmitted to the processing device 120.

In some embodiments, the trigger condition may be a predetermined condition for enabling a touch function of the touch panel 119. For example, the trigger condition may be a condition that prevents an accidental touch or a mistaken touch on the touch panel 119 from being recognized as an instruction for operating the medical device 110. In some embodiments, the trigger condition may be a predetermined trigger condition for triggering a control operation of one or more components (e.g., the gantry 112, the detector 114, the radiation source 116, the patient bed 118, etc.) of the medical device 110. For example, the trigger condition may include a predetermined trigger condition for moving the patient bed 118 of the medical device 110. An exemplary process for controlling a movement of a patient bed may be found elsewhere (e.g., FIG. 6 and the descriptions thereof of the present disclosure). As another example, the trigger condition may include a predetermined trigger condition for controlling an exposure function of the radiation source 116 of the medical device 110. The exposure function of the radiation source 116 may include a switch-on or a switch-off of the radiation source 116, an exposure duration of the radiation source 116, or an intensity of radiation signals emitted from the radiation source 116, or the like, or any combination thereof. As still another example, the trigger condition may include a predetermined trigger condition for controlling a rotation of the gantry 112.

In some embodiments, the trigger condition (or referred to as the first trigger condition) may include a position of the gesture being within a predetermined region of the touch panel 119, a duration of the gesture exceeding a duration threshold, the gesture satisfies a predetermined gesture pattern (e.g., a tap gesture, a double-tap gesture, a slide gesture (to a predetermined position), a drag gesture (e.g., to a predetermined position), a swipe gesture (e.g., to a predetermined position), a pinch gesture, etc.) In some embodiments, the predetermined region may allow a display of the icon(s) on the touch panel 119 if the trigger condition is satisfied. The duration threshold and/or the predetermined gesture pattern may prevent an accidental touch or a mistaken touch on the touch panel 119 from being recognized as an instruction for operating the medical device 110. In some embodiments, the trigger condition, the predetermined region, the duration threshold, and/or the predetermined gesture pattern may be predetermined and stored in a storage device (e.g., the storage device 130, the storage 220, or the storage 390) of the medical system 100. In some embodiments, the trigger condition may be displayed on the touch panel 119.

A result of determining whether the gesture (or referred as the first gesture) from a user (e.g., an operator) of the medical device 110 satisfies the trigger condition may be used to determine whether to trigger the touch function of the touch panel 119 or whether to trigger the control operation of the one or more components (or whether to display information relating to the control operation). For example, in response to determining that the gesture satisfies the trigger condition, the processing device 120 may proceed to operation 504. Otherwise, the touch function of the touch panel 119 may not be enabled or the touch panel 119 may remain the original information displayed before detecting the gesture. In 504, in response to determining that the gesture satisfies the trigger condition, the processing device 120 (e.g., the icon generating module 420) may generate instructions for causing at least one icon (or referred to as first icon) to be displayed on the touch panel (e.g., the touch panel 119).

In some embodiments, the at least one icon may be configured to control the one or more components of the medical device 110. For example, the at least one icon may be configured to control the movement of the patient bed (e.g., the patient bed 118). The at least one icon may be configured to control a movement direction, a moving speed, a target position of the patient bed 118, or the like, or any combination thereof. As another example, the at least one icon may be configured to control the radiation source 116 of the medical device 110. The at least one icon may be configured to control the switch-on or switch-off of the radiation source 116, the exposure duration of the radiation source 116, the intensity of radiation signals emitted from the radiation source 116, or the like, or any combination thereof. As still another example, the at least one icon may be configured to control the gantry 112 of the medical device 110. The at least one icon may be configured to control a rotation direction of the gantry 112, a rotation angle of the gantry 112, a rotation speed of the gantry 112, a switch-on or switch-off of a rotation of the gantry 112, or the like, or any combination thereof.

In some embodiments, before detecting the gesture, the touch panel 119 may display information relating to the medical device 110, information relating to a patient who is using the medical device 110, or the like, or any combination thereof. Exemplary information relating to the medical device 110 may include a device type, a device name, a working status of the medical device 110 (e.g., a working status of a component of the medical device 110), or the like, or any combination thereof. Exemplary information relating to the patient may include a patient's name, a patient's age, an ID of the patient, a type of a medical examination that the patient takes, or the like, or any combination thereof.

In some embodiments, the processing device 120 may send the instructions to the touch panel 119 for causing regarding the at least one icon to be displayed. In some embodiments, the at least one icon may be displayed centered on or in the vicinity of the gesture or displayed anywhere on the touch panel 119. In some embodiments, the at least one icon may be displayed at least partially transparent to or spaced apart from other information (e.g., the information relating to the medical device 110, the information relating to the patient) displayed on the touch panel 119 so that such other information remains visible along with the displayed at least one icon. For example, the at least one icon may be displayed within a transparent layer that overlays information already displayed before the at least one icon is displayed. As another example, the at least one icon may be displayed using different colors from that of other information to make the at least one icon visually distinguished from other information. As still another example, the at least one icon may be displayed in different places from other information.

In 506, the processing device 120 (e.g., the control parameter determining module 430) may determine at least one control parameter of the medical device (e.g., the medical device 110) based at least on a gesture (or referred to as a second gesture) directed to the at least one icon.

In some embodiments, the at least one control parameter of the medical device 110 may be configured to control the one or more components of the medical device 110. For example, the at least one control parameter may include a movement parameter for controlling a movement of the patient bed 118, a control parameter for controlling exposure of the radiation source 116, a control parameter for controlling the rotation of the gantry 112, a control parameter for controlling the detector 114, or the like, or any combination thereof. Exemplary movement parameters may include a movement direction, a movement speed, a target position of the patient bed 118, or the like, or any combination thereof. Exemplary control parameters for controlling exposure of the radiation source 116 may include a switch-on, a switch-off, an exposure duration of the radiation source 116, an intensity of radiation signals emitted from the radiation source 116, or the like, or any combination thereof. Exemplary control parameters for controlling the rotation of the gantry 112 may include a rotation direction, a rotation angle, a rotation speed, a switch-on, a switch-off of a rotation of the gantry 112, or the like, or any combination thereof. Exemplary control parameters for controlling the detector 114 may include a switch-on, a switch-off of the detector 114, or the like, or any combination thereof.

In some embodiments, after displaying the at least one icon, the touch panel 119 may detect the gesture (or referred to as the second gesture) directed to the at least one icon from the user. The processing device 120 may determine the at least one control parameter based on the second gesture directed to the at least one icon. For example, the touch panel 119 is a single-touch panel that detects only one point of contact at a time, thereby the at least one control parameter is determined only according to the second gesture directed to the at least one icon. Alternatively, the processing device 120 may determine the at least one control parameter based on the first gesture (i.e., the gesture described in the operation 502) and the second gesture directed to the at least one icon. For example, the touch panel 119 is a multi-touch panel that detects more than one point of contact at a time. The second gesture and the first gesture may be detected by the touch panel 119 simultaneously. Only when the first gesture and the second gesture are simultaneously detected, the processing device 120 may generate the at least one control parameter.

In some embodiments, after determining the at least one control parameter, the processing device 120 may send the at least one control parameter to a control module of the corresponding component(s). For example, the at least one control parameter includes a movement parameter of the patient bed 118, and the movement parameter may be sent to a movement control module (e.g., a motor for controlling the movement of the patient bed 118). The movement control module may control the patient bed 118 to move according to the movement parameter. In some embodiments, to ensure an accurate and reliable control of the one or more components, the at least control parameter is generated and sent to the control module simultaneously with the detecting of the second gesture (and the first gesture). That is, once the touch panel 119 does not detect the second gesture (and the first gesture), the control process of the corresponding component(s) is terminated, and the operation of the medical device 119 terminates or pauses. In some embodiments, to ensure a safe and reliable control of the one or more components, after the second gesture (and the first gesture) is detected, the at least one control parameter may be displayed on the touch panel 119. The displayed control parameter(s) may be used for the user to confirm, and once the user confirms the control parameter(s) by a certain icon or after a predetermined time period, the processing device 120 may send the at least one control parameter to the control module to perform the control process of the corresponding component(s).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the gesture may be a non-contact gesture. Accordingly, the touch panel in FIG. 5 may be replaced by a non-contact sensor, such as a camera, a motion sensor, etc. In some embodiments, one or more operations may be omitted and/or one or more additional operations may be added. For example, two or more components of the medical device 110 may be controlled in sequence. A first component may be controlled according to the process 500 including the operations 502-506, and the second component may be controlled according to the process 500 including the operation 502-506 or one or more operations (e.g., the operation 506) of the process 500. As another example, the operation 506 may be divided into two operations for detecting the gesture directed to the at least one icon and determining the at least one control parameter, respectively. As a further example, more than one first gesture or more than one second gesture (each second gesture being directed at or relating to one or more displayed icons) are needed to trigger the display of the at least one icon or the operation of the medical device 110. As still another example, in response to determining that the gesture does not satisfy the trigger condition, the touch panel 119 may remain the original information displayed before detecting the gesture or a notification reminding notifying the user that the gesture is invalid. As still another example, one or more other optional operations (e.g., a storing operation) may be added elsewhere in the process 500. In the storing operation, the processing device 120 may store information and/or data (e.g., the at least one control parameter for moving the patient bed) associated with the medical system 100 in a storage device (e.g., the storage device 130) disclosed elsewhere in the present disclosure.

FIG. 6 is a flowchart illustrating an exemplary process 600 for controlling a movement of a patient bed using a touch panel according to some embodiments of the present disclosure. In some embodiments, the process 600 may be implemented as a set of instructions (e.g., an application) stored in the storage device 130, the storage 220, or the storage 390. The processing device 120, the processor 210, and/or the CPU 340 may execute the set of instructions, and when executing the instructions, the processing device 120, the processor 210, and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of the process 600 illustrated in FIG. 6 and described below is not intended to be limiting.

In 602, a determination may be made as to whether a gesture (or referred to as a first gesture) that relates to a movement operation on a touch panel (e.g., the touch panel 119) satisfies a movement trigger condition (or referred to a first trigger condition). In some embodiments, the determination may be made by the processing device 120 (e.g., the trigger condition determining module 410). In some embodiments, the determination may be made by the terminal 140 or the touch panel 119, and information regarding the determination may be transmitted to the processing device 120.

In some embodiments, the first trigger condition may be a predetermined condition for enabling a touch function of the touch panel 119. For example, the first trigger condition may be a condition that prevents an accidental touch or a mistaken touch on the touch panel 119 from being recognized as an instruction for operating the medical device 110. In some embodiments, the first trigger condition may be a predetermined trigger condition for triggering the movement operation of a patient bed (e.g., the patient bed 118). For example, the first trigger condition may include a predetermined trigger condition for moving the patient bed 118. In some embodiments, the patient bed may be an independent hospital bed. Alternatively, the patient bed may be the patient bed 118 of the medical device 110.

In some embodiments, the first trigger condition may be described elsewhere (e.g., the operation 502) of the present disclosure. A result of determining whether the first gesture satisfies the first trigger condition may be used to determine whether to trigger the touch function of the touch panel 119 or whether to trigger the movement operation of patient bed 118 (or whether to display information relating to the movement operation). For example, in response to determining that the first gesture satisfies the first trigger condition, the processing device 120 may proceed to operation 604. Otherwise, the touch function of the touch panel 119 may not be enabled or the touch panel 119 may remain the original information displayed before detecting the first gesture.

In 604, in response to determining that the first gesture satisfies the first trigger condition, the processing device 120 (e.g., the icon generating module 420) may generate instructions for causing at least one icon to be displayed on the touch panel (e.g., the touch panel 119).

In some embodiments, the at least one icon may be configured to control the movement of the patient bed (e.g., the patient bed 118). The at least one icon may be configured to control a movement direction, a moving speed, a target position of the patient bed 118, or the like, or any combination thereof. The displaying of the at least one icon may be found elsewhere (e.g., the operation 504) of the present disclosure.

In 606, the processing device 120 (e.g., the control parameter determining module 430) may determine at least one movement parameter of the patient bed based at least on a second gesture directed to the at least one icon.

In some embodiments, the at least one movement parameter may include a movement direction, a movement speed, a target position of the patient bed 118, or the like, or any combination thereof. In some embodiments, after displaying the at least one icon, the touch panel 119 may detect the second gesture directed to the at least one icon from the user. The processing device 120 may determine the at least one movement parameter based on the second gesture. For example, the touch panel 119 is a single-touch panel that detects only one point of contact at a time, thereby the at least one movement parameter is determined only according to the second gesture. Alternatively, the processing device 120 may determine the at least one movement parameter based on the first gesture and the second gesture. For example, the touch panel 119 is a multi-touch panel that detects more than one point of contact at a time. The second gesture and the first gesture may be detected by the touch panel 119 simultaneously. Only when the first gesture and the second gesture are simultaneously detected, the processing device 120 may generate the at least one movement parameter.

In some embodiments, to ensure an accurate and reliable control of the patient bed 118, the at least movement parameter is generated and sent to the control module (e.g., the motor of the patient bed 118) simultaneously with the detecting of the second gesture (and the first gesture). That is, once the touch panel 119 does not detect the second gesture (and the first gesture), the movement process of the patient bed 118 is terminated, the patient bed 118 stops moving. In some embodiments, to ensure a safe and reliable control of the patient bed 118, after the second gesture (and the first gesture) is detected, the at least one movement parameter may be displayed on the touch panel 119. The displayed movement parameter(s) may be used for the user to confirm, and once the user confirms the movement parameter(s) by a certain icon or after a predetermined time period, the processing device 120 may send the at least one movement parameter to the control module to move the patient bed 118.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 606 may be divided into two operations for detecting the second gesture and determining the at least one movement parameter of the patient bed, respectively. As a further example, more than one first gesture or more than one second gesture (each second gesture being directed at or relating to one or more displayed icons) are needed to trigger the display of the at least one icon or the movement operation of the patient bed 118. As still another example, For example, in response to determining that the first gesture does not satisfy the first trigger condition, the touch panel 119 may remain the original information displayed before detecting the first gesture or a notification reminding notifying the user that the first gesture is invalid. As another example, one or more other optional operations (e.g., a storing operation) may be added elsewhere in the process 600. In the storing operation, the processing device 120 may store information and/or data (e.g., the at least one movement parameter for moving the patient bed 118) associated with the medical system 100 in a storage device (e.g., the storage device 130) disclosed elsewhere in the present disclosure.

Figure 7A:
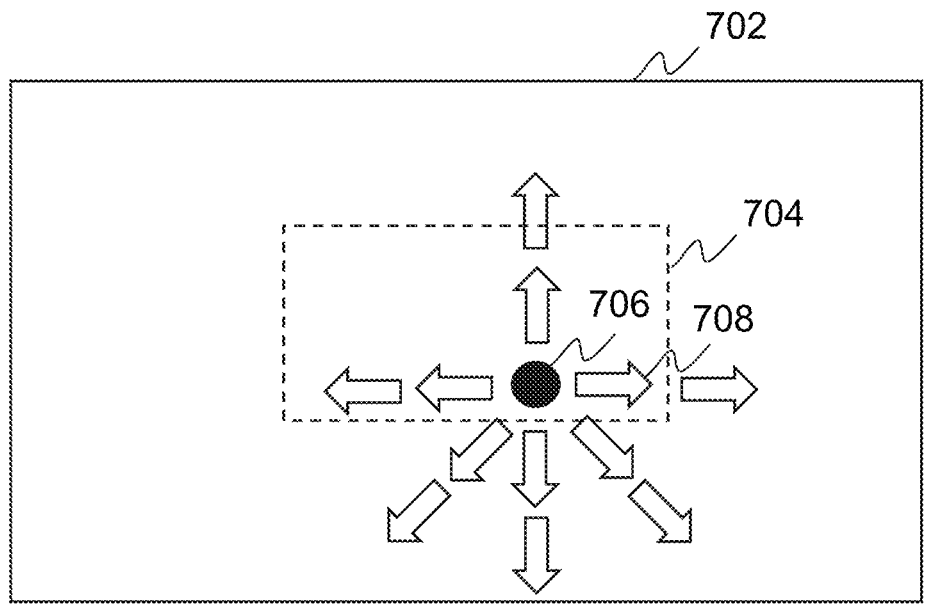
FIG. 7A is a schematic diagram illustrating an exemplary interface for controlling a movement of a patient bed according to some embodiments of the present disclosure.

FIG. 7A is a schematic diagram illustrating an exemplary interface 702 for controlling a movement of a patient bed according to some embodiments of the present disclosure. The first trigger condition may include that a gesture is within a predetermined region 704 of the interface 702 of a touch panel (e.g., the touch panel 119), and a duration of the gesture exceeds a duration threshold. In some embodiments, the predetermined region 704 may allow a display of the icon(s) on the interface 702 if the first trigger condition is deemed satisfied. The duration threshold may prevent an accidental touch or a mistaken touch on the interface 702 from being recognized as an instruction for operating the medical device 110. The processing device 120 may determine whether a first gesture 706 output by a user (e.g., an operator of the control panel) satisfies the first trigger condition. In response to determining that the first gesture 706 is within the predetermined region 704 and the duration of the first gesture 706 exceeds the duration threshold, the processing device 120 may determine that the first trigger condition is satisfied. As shown in FIG. 7A, icons 708 shown as arrows are generated and displayed on the interface 702 centered on the first gesture 706. The icons 708 indicate movement directions and movement speeds. The movement speed may relate to a distance between a second gesture directed to the arrows and an edge of the touch panel (or the interface 702). The less distance between the second gesture and the edge that the corresponding arrow(s) points to, the greater the moving speed. For example, the second gesture may be a slide gesture on the interface 702 along left arrows of the icons 708. The less distance between an endpoint of the slide gesture and the left edge of the interface 702, the greater the moving speed. In some embodiments, moving speeds corresponding to different second gestures may be predetermined by the processing device 120 (e.g., according to a machine learning method). The interface 702 shown in FIG. 7A may be implemented on a single-touch panel. That is, once the icons 708 are generated and displayed on the interface 702, the first gesture is no more detected. The touch panel 119 may detect the second gesture directed to the icons 708, and the movement parameters may be determined according to the second gesture. Alternatively, the interface 702 shown in FIG. 7A may be implemented on a multi-touch panel. That is, after the icons 708 is generated and displayed on the interface 702, the first gesture is still on the interface 702 and detected by the touch panel 119. The movement parameters may be determined according to the first gesture and the second gesture only when the first gesture and the second gesture directed to the icons 708 are detected by the touch panel 119 at a time.

Figure 7B:
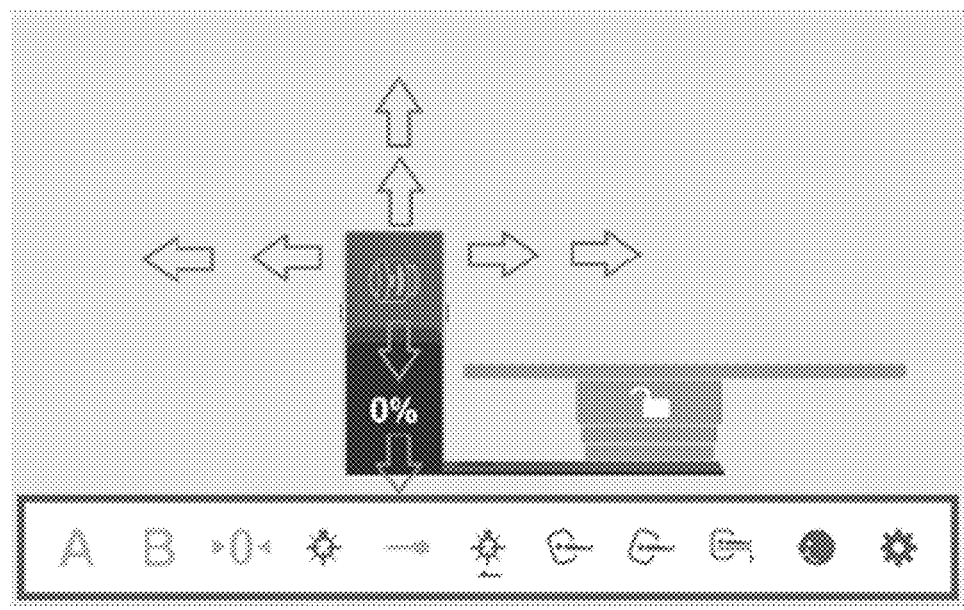
FIG. 7B is a schematic diagram illustrating an exemplary interface of a touch panel according to some embodiments of the present disclosure.

FIG. 7B is a schematic diagram illustrating an exemplary interface of a touch panel according to some embodiments of the present disclosure. As shown in FIG. 7B, the at least one icon is displayed together with other information (including information relating to a patient and information relating to the patient bed) on the touch panel. The at least one icon is displayed using a transparent layer and covered on displaying layers of other information. It should be noted that FIG. 7B is shown in black and white diagram only for illustration purposes, the at least one icon may be displayed in any other manner to make the at least one icon visually distinguished from other information. For example, the at least one icon may be displayed in different colors and/or spaced apart from other information.

Figure 8A:
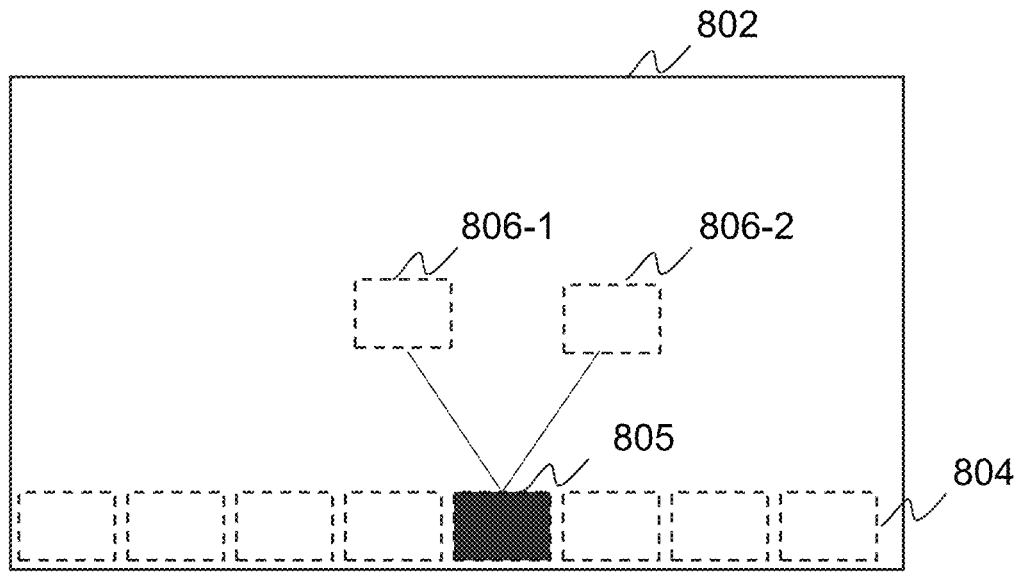
FIG. 8A is a schematic diagram illustrating an exemplary interface for controlling a movement of a patient bed according to some embodiments of the present disclosure.

FIG. 8A is a schematic diagram illustrating an exemplary interface 802 for controlling a movement of a patient bed according to some embodiments of the present disclosure.

The first trigger condition may include that a gesture is within a predetermined region 804 of the interface 802 of a touch panel (e.g., the touch panel 119). The processing device 120 may determine whether a first gesture 805 output by a user (e.g., an operator of the control panel) satisfies the first trigger condition. The predetermined region 804 may include one or more icons that are already displayed on the interface 802 before detecting the first gesture 805. In response to determining that the first gesture 805 is within the predetermined region 804 (or directed to an icon of the predetermined region 804), the processing device 120 may determine that the first trigger condition is satisfied. As shown in FIG. 8A, icons 806-1 and 806-2 shown as dotted rectangles are generated and displayed on the interface 802. The icons 806-1 and 806-2 indicate target positions of the patient bed 118. For example, the icon 806-1 may indicate a first predetermined target position of the patient bed 118, and the icon 806-2 indicates a second predetermined target position of the patient bed 118. In some embodiments, the interface 802 shown in FIG. 8A may be implemented on a single-touch panel. That is, once the icons 806-1 and 806-2 are generated and displayed on the interface 802, the first gesture is no more detected. The touch panel 119 may detect the second gesture directed to one of the icons 806-1 and 806-2, and the movement parameters may be determined according to the second gesture. Alternatively, the interface 802 shown in FIG. 8A relates to a multi-touch panel. That is, after the icons 806-1 and 806-2 are generated and displayed on the interface 802, the first gesture is still on the interface 802 and detected by the touch panel 119. The movement parameters may be determined according to the first gesture and the second gesture only when the first gesture and the second gesture directed to the one of the icons 806-1 and 806-2 are detected by the touch panel 119 at a time.

Figure 8B:
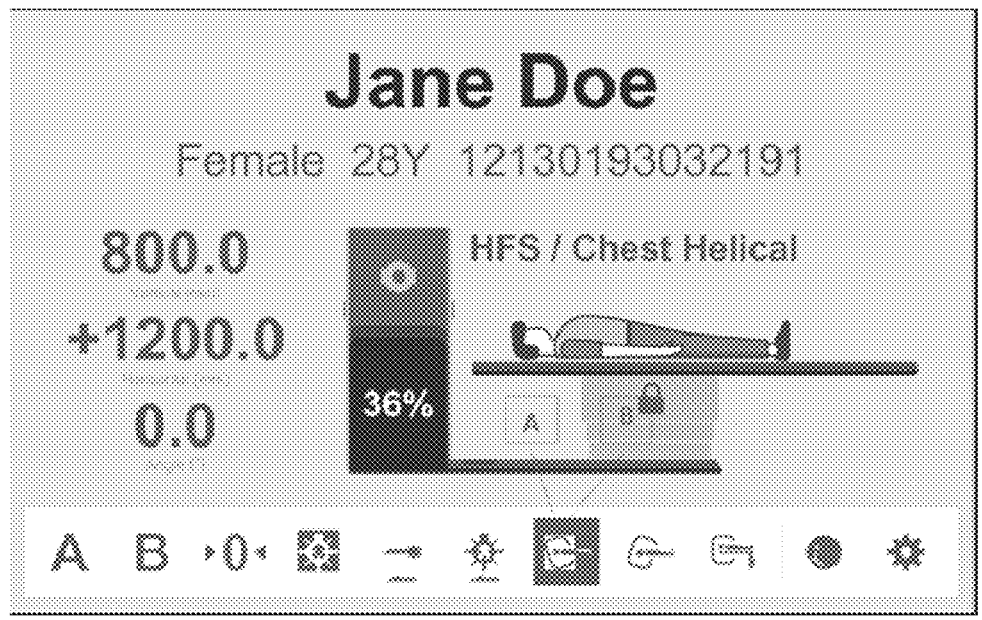
FIG. 8B is a schematic diagram illustrating an exemplary interface of a touch panel according to some embodiments of the present disclosure.

FIG. 8B is a schematic diagram illustrating an exemplary interface of a touch panel according to some embodiments of the present disclosure. As shown in FIG. 8B, the at least one icon is displayed together with other information (including information relating to a patient and information relating to the patient bed) on the touch panel. The at least one icon is displayed using a transparent layer and covered on displaying layers of other information. It should be noted that FIG. 8B is shown in black and white diagram only for illustration purpose, the at least one icon may be displayed in any other manner to make the at least one icon visually distinguished from other information. For example, the at least one icon may be displayed in different colors and/or spaced apart from other information.

FIG. 9 is a flowchart illustrating an exemplary process 900 for controlling a medical device using a touch panel according to some embodiments of the present disclosure. In some embodiments, the process 900 may be implemented as a set of instructions (e.g., an application) stored in the storage device 130, the storage 220, or the storage 390. The processing device 120, the processor 210, and/or the CPU 340 may execute the set of instructions, and when executing the instructions, the processing device 120, the processor 210, and/or the CPU 340 may be configured to perform the process 900. The operations of the illustrated process presented below are intended to be illustrative. In some embodiments, the process 800 may be accomplished with one or more additional operations not described and/or without one or more of the operations discussed. Additionally, the order of the operations of the process 900 illustrated in FIG. 9 and described below is not intended to be limiting.

In 902, a determination may be made as to whether a third gesture on a touch panel (e.g., the touch panel 119) satisfies a second trigger condition for operating the medical device 110. In some embodiments, the determination may be made by the processing device 120 (e.g., the trigger condition determining module 410). In some embodiments, the determination may be made by the terminal 140 or the touch panel 119, and information regarding the determination may be transmitted to the processing device 120.

In some embodiments, the second trigger condition may be a predetermined trigger condition for triggering a control operation of one or more components (e.g., the gantry 112, the detector 114, the radiation source 116, etc.) of the medical device 110. For example, the second trigger condition may include an exposure trigger condition for controlling an exposure operation of the radiation source 116 of the medical device 110. The exposure operation of the radiation source 116 may include a switch-on or a switch-off of the radiation source 116, an exposure duration of the radiation source 116, or an intensity of radiation signals emitted from the radiation source 116, or the like, or any combination thereof. As another example, the trigger condition may include a predetermined trigger condition for controlling a rotation of the gantry 112.

In some embodiments, the second trigger condition may be the same as the first trigger condition described in operation 502 of the present disclosure. Alternatively, the second trigger condition may be different from the first trigger condition. For example, the first trigger condition may include a position of a gesture being within a predetermined region of the touch panel 119 and a duration of the gesture exceeding a duration threshold. The second trigger condition may include a gesture satisfies a predetermined gesture pattern (e.g., a tap gesture, a double-tap gesture, a slide gesture (e.g., to a predetermined position), a drag gesture (e.g., to a predetermined position), a swipe gesture (e.g., to a predetermined position), a pinch gesture, etc.).

A result of determining whether the third gesture from a user (e.g., an operator) of the medical device 110 satisfies the second trigger condition may be used to determine whether to trigger the control operation of the one or more components (or whether to display information relating to the control operation). For example, in response to determining that the third gesture satisfies the second trigger condition, the processing device 120 may proceed to operation 904. Otherwise, the touch panel 119 may remain the original information displayed before detecting the third gesture or a notification notifying the user that the third gesture is invalid. In some embodiments, the result of determining whether the third gesture satisfies the second trigger condition may further indicate control parameter(s) associated with the third gesture. For example, the second trigger condition may include three conditions including that a gesture satisfies a slide gesture from a predetermined start point to a first predetermined destination, the gesture satisfies a slide gesture from the predetermined start point to a second predetermined destination, and the gesture satisfies a slide gesture from the predetermined start point to a third predetermined destination. Different destinations may indicate or be associated with different control parameters. For example, the first predetermined destination relates to a switch-on of the radiation source 116, the second predetermined destination relates to a switch-off of the radiation source 116, and the third predetermined destination relates to an intensity of radiation signals emitted from the radiation source 116.

In 904, in response to determining that the third gesture satisfies the first trigger condition, the processing device 120 (e.g., the control parameter determining module 430) may determine at least one control parameter of a medical device (e.g., the medical device 110) based at least on the third gesture.

In some embodiments, the at least one control parameter and the process for determining the at least one control parameter may be similar to those described in the operation 506 of FIG. 5 of the present disclosure. In some embodiments, after determining that the third gesture satisfies the first trigger condition, the processing device 120 (e.g., the icon generating module 420) may further generate instructions for causing icon(s) to be displayed on the touch panel 119. The icon(s) may be configured to control the one or more components. The processing device 120 may control the one or more components based on a gesture directed to the generated icon(s). Alternatively, the processing device 120 may control the one or more components based on a gesture directed to the generated icon(s) and the third gesture simultaneously. The process of determining the at least one control parameter based on the third gesture and the gesture directed to the generated icon(s) may be described elsewhere (e.g., FIG. 10 and the descriptions thereof) in the present disclosure.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a storing operation) may be added elsewhere in the process 900. In the storing operation, the processing device 120 may store information and/or data (e.g., the at least one control parameter for controlling one or more components of the medical device 110) associated with the medical system 100 in a storage device (e.g., the storage device 130) disclosed elsewhere in the present disclosure.

FIG. 10 is a flowchart illustrating an exemplary process 1000 for determining at least one control parameter of a medical device according to some embodiments of the present disclosure. In some embodiments, the process 1000 may be implemented as a set of instructions (e.g., an application) stored in the storage device 130, the storage 220, or the storage 390. The processing device 120, the processor 210, and/or the CPU 340 may execute the set of instructions, and when executing the instructions, the processing device 120, the processor 210, and/or the CPU 340 may be configured to perform the process 1000. The operations of the illustrated process presented below are intended to be illustrative. In some embodiments, the process 1000 may be accomplished with one or more additional operations not described and/or without one or more of the operations discussed. Additionally, the order of the operations of the process 1000 illustrated in FIG. 10 and described below is not intended to be limiting.

In 1002, the processing device 120 (e.g., the icon generating module 420) may generate instructions for causing at least one second icon to be displayed on the touch panel. In some embodiments, the at least one second icon may be configured to control the medical device 110.

In some embodiments, the processing device 120 may send the instructions to the touch panel 119 for causing regarding the at least one second icon to be displayed. In some embodiments, the at least one second icon and the process for generating (or displaying) of the at least one second icon may be similar to or different from those relating the at least one icon (or referred to as the first icon) described in the operation 504 of FIG. 5 of the present disclosure. For example, the at least one second icon may have different shapes from the first icon. The process for generating the at least one second icon may be similar to that of the at least one first icon.

In 1004, the processing device 120 (e.g., the control parameter determining module 430) may determine at least one control parameter of the medical device based on the third gesture and a fourth gesture directed at the at least one second icon.

In some embodiments, the third gesture and the fourth gesture may be detected by the touch panel simultaneously. For example, the touch panel 119 is a multi-touch panel that detects more than one point of contact at a time. The third gesture and the fourth gesture may be detected by the touch panel 119 simultaneously. Only when the third gesture and the fourth gesture are simultaneously detected, the processing device 120 may generate the at least one control parameter.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a storing operation) may be added elsewhere in the process 1000. In the storing operation, the processing device 120 may store information and/or data (e.g., the at least one second icon, the at least one control parameter for controlling one or more components of the medical device 110) associated with the medical system 100 in a storage device (e.g., the storage device 130) disclosed elsewhere in the present disclosure.

Figure 11A:
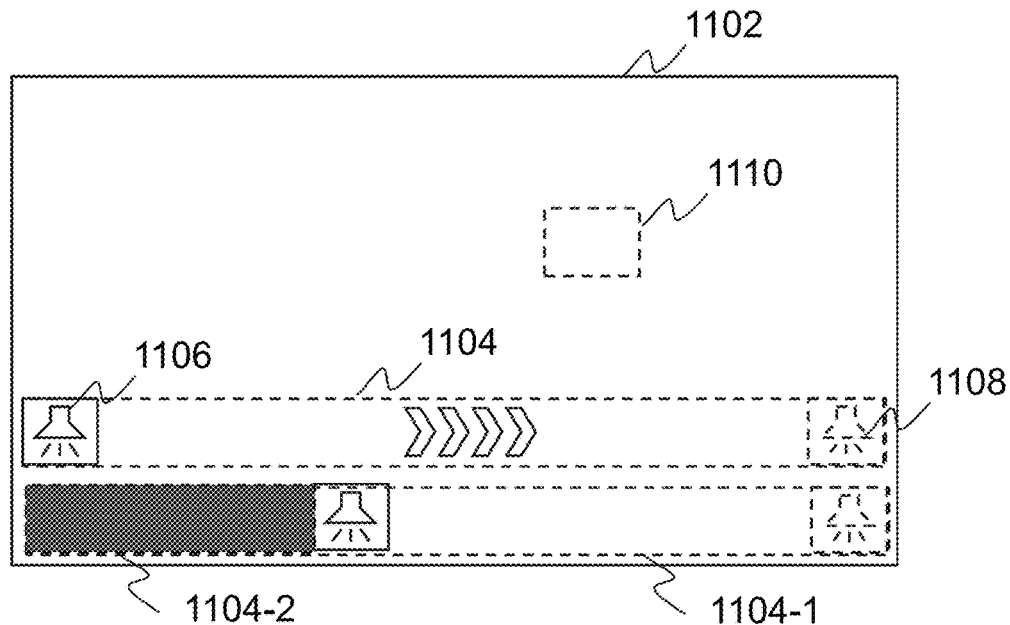
FIG. 11A is a schematic diagram illustrating an exemplary interface for controlling a radiation source of a medical device according to some embodiments of the present disclosure.

FIG. 11A is a schematic diagram illustrating an exemplary interface 1102 for controlling a radiation source of a medical device according to some embodiments of the present disclosure.

Figure 11B:
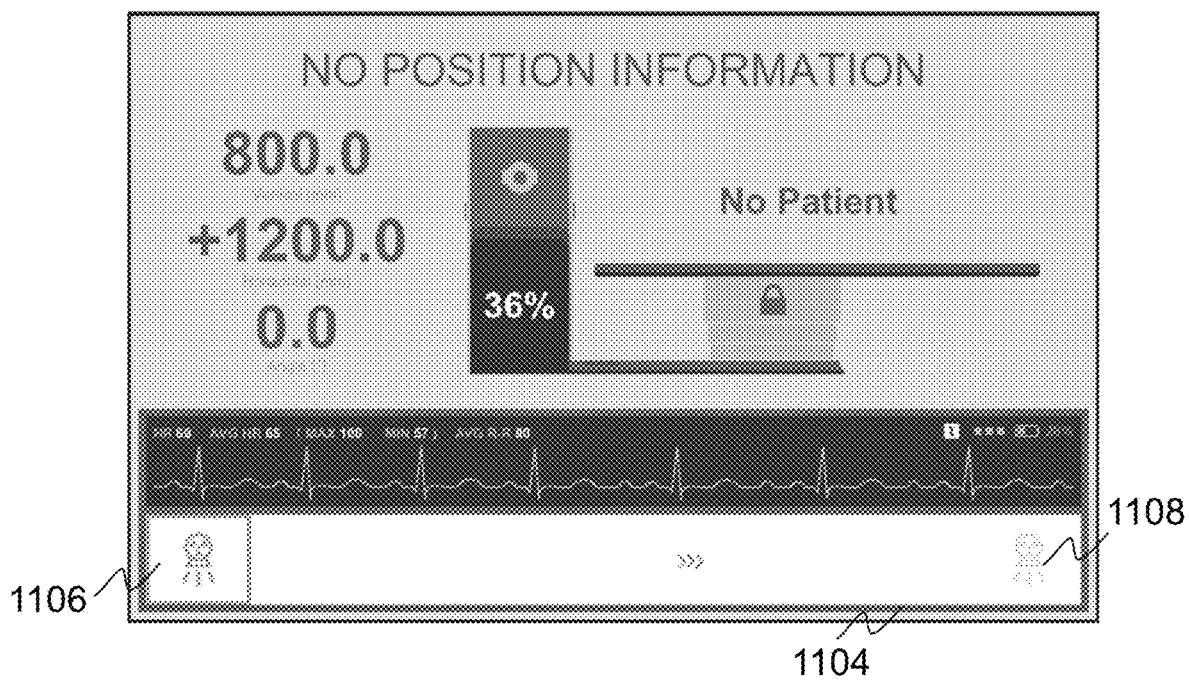
FIG. 11B is a schematic diagram illustrating an exemplary interface of a touch panel according to some embodiments of the present disclosure.

An exposure trigger condition (or referred to as the second trigger condition) may include that a gesture satisfies a predetermined slide pattern from a predetermined start point 1106 (e.g., a start point shown as a solid square in FIG. 11A) to a predetermined destination 1108 (e.g., a destination shown as a dotted square in FIG. 11A) along a predetermined region 1104 (e.g., a region or direction shown as a dotted rectangle in FIG. 11A). In some embodiments, a sliding process of the slide pattern may be visible. In some embodiments, the region that the gesture has reached or not may be shown in different colors, different textures, etc. For example, as shown in FIG. 11A, region 1104-1 (shown in white) shows that the gesture has not reached, and region 1104-2 (shown in a dark color) shows that the gesture has slid through. The processing device 120 may determine whether a gesture (or referred to as the third gesture) that relates to an exposure operation of the radiation source (e.g. the radiation source 116) satisfies the exposure trigger condition. In response to determining that the third gesture is a slide gesture from the predetermined start point 1106 to the predetermined destination 1108 along a predetermined region 1104, the processing device 120 may determine that the exposure trigger condition is satisfied. In some embodiments, in response to determining that the exposure trigger condition is satisfied, control parameter(s) of the radiation source 116 may be generated and sent to a control module (e.g., a switch) of the radiation source 116 to turn on the radiation source 116. FIG. 11B is a schematic diagram illustrating an exemplary interface of a touch panel according to some embodiments of the present disclosure. As shown in FIG. 11B, if the gesture (or referred to as the third gesture) that relates to an exposure operation is a slide gesture from the predetermined start point 1106 to the predetermined destination 1108 along a predetermined region 1104, the processing device 120 may determine that the exposure trigger condition is satisfied, and a switch-on instruction of the radiation source 116 may be generated and sent to a control module (e.g., a switch) of the radiation source 116, thereby the radiation source 116 may be turned on.

Alternatively, as shown in FIG. 11A, an icon 1110 shown as a dotted rectangle is generated and displayed on the interface 702 in response to determining that the exposure trigger condition is satisfied. The icon 1110 may indicate a switch-on or a switch-off of the radiation source 116, an exposure duration of the radiation source 116, or an intensity of radiation signals emitted from the radiation source 116, or the like, or any combination thereof. The interface 1102 as shown in FIG. 11A relates to a single-touch panel. That is, once the icon 1110 is generated and displayed on the interface 1102, the third gesture cannot be detected any more. The touch panel 119 may detect the fourth gesture directed to the icon 1110, and the control parameter(s) may be determined according to the fourth gesture. Alternatively, the interface 1102 as shown in FIG. 11A may be implemented on a multi-touch panel. That is, after the icon 1108 is generated and displayed on the interface 1102, the third gesture may need to be maintained and detected by the touch panel 119. The control parameter(s) may be determined according to the third gesture and the fourth gesture only when the third gesture and the fourth gesture directed to the icon 1110 are detected by the touch panel 119 at a time. In some embodiments, in response to determining that the exposure trigger condition is satisfied, the instructions for causing the at least one icon that is configured to control the radiation source may be generated and/or displayed on the touch panel after a predetermined latency. For example, to ensure a safe and reliable control of the radiation source, after determining that the exposure trigger condition is satisfied for a predetermined time period (e.g., 200 ms, 500 ms, 800 ms, Is, etc.), the icon 1110 shown as a dotted rectangle may be generated and displayed on the interface 702 as shown in FIG. 11A.

It should be noted that the exemplary interfaces of the touch panel in FIGS. 7A, 7B, 8A, 8B, 11A, and 11B are for the purpose of describing particular example embodiments only and is not intended to be limiting. For example, the predetermined destination 1108 in FIG. 11A may be any point (e.g., a distance from the predetermined start point 1106 and the predetermined destination 1108 is a length of a predetermined count (e.g., two, three, for, etc.) of sliders) within the predetermined region 1104.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PUP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system for controlling a movement of a patient bed using a touch panel, comprising:
    at least one storage device including a set of instructions; and
    at least one processor in communication with the patient bed, the touch panel, and the at least one storage device, wherein when executing the set of instructions, the at least one processor is directed to cause the system to perform operations including:
    determining whether a first gesture on the touch panel satisfies a first trigger condition;
    in response to determining that the first gesture satisfies the first trigger condition, generating instructions for causing at least one icon to be displayed on the touch panel, the at least one icon being configured to control the movement of the patient bed; and
    determining, at a moment when a second gesture directed to the at least one icon is detected by the touch panel, and the first gesture is still detected by the touch panel, at least one movement parameter of the patient bed based on the second gesture and the first gesture.

2. The system of claim 1, wherein the at least one movement parameter includes at least one of a movement direction, a movement speed, or a target position of the patient bed.

3. The system of claim 2, wherein the movement speed relates to a distance between the second gesture and an edge of the touch panel.

4. The system of claim 3, wherein the less distance between the second gesture and the edge of the touch panel, the greater the moving speed.

5. The system of claim 1, wherein the first trigger condition includes:
    a position of the first gesture on the touch panel being within a predetermined region of the touch panel.

6. The system of claim 1, wherein the first trigger condition includes:
    a duration of the first gesture on the touch panel exceeding a duration threshold.

7. The system of claim 1, wherein the at least one icon displayed on the touch panel is at least partially transparent to or spaced apart from other information displayed on the touch panel.

8. The system of claim 1, wherein the patient bed is included in a medical device, and the operations further include:
    determining whether a third gesture on the touch panel satisfies a second trigger condition; and
    in response to determining that the third gesture satisfies the second trigger condition, determining at least one control parameter of the medical device based at least on the third gesture.

9. The system of claim 8, wherein
    the at least one control parameter is configured to control a radiation source of the medical device, and
    the at least one control parameter includes at least one of: a switch-on of the radiation source, a switch-off of the radiation source, an exposure duration of the radiation source, or an intensity of the radiation source.

10. The system of claim 8, wherein the determining the at least one control parameter of the medical device based at least on the third gesture includes:
    in response to determining that the third gesture satisfies the second trigger condition, generating instructions for causing at least one second icon to be displayed on the touch panel, the at least one second icon being configured to control the medical device; and determining, at a moment when a fourth gesture directed at the at least one second icon is detected by the touch panel, and the third gesture is still detected by the touch panel, the at least one control parameter of the medical device based on the third gesture and the fourth gesture.

11. A system for controlling a radiation source of a medical device using a touch panel, comprising:

at least one storage device including a set of instructions; and at least one processor in communication with the radiation source, the touch panel, and the at least one storage device, wherein when executing the set of instructions, the at least one processor is directed to cause the system to perform operations including:

determining whether a first gesture that relates to an exposure operation on the touch panel satisfies an exposure trigger condition;

in response to determining that the first gesture satisfies the exposure trigger condition, determining at least one control parameter of the radiation source based at least on the first gesture, wherein the exposure trigger condition includes that the first gesture satisfies a slide gesture from a predetermined start point to a predetermined destination; and controlling the radiation source based the at least one control parameter.

12. A method for controlling a movement of a patient bed using a touch panel, comprising:

determining whether a first gesture on the touch panel satisfies a first trigger condition;

in response to determining that the first gesture satisfies the first trigger condition, generating instructions for causing at least one icon to be displayed on the touch panel, the at least one icon being configured to control the movement of the patient bed;

determining, at a moment when a second gesture directed to the at least one icon is detected by the touch panel, and the first gesture is still detected by the touch panel, at least one movement parameter of the patient bed based on the second gesture and the first gesture.

13. The system of claim 12, wherein the operations further include:

in response to determining that the first gesture satisfies the exposure trigger condition, generating instructions for causing at least one first icon to be displayed on the touch panel; and controlling a switch-off of the radiation source at a moment when a second gesture directed at the at least one first icon is detected by the touch panel.

14. The system of claim 12, wherein the determining at least one control parameter of the radiation source based at least on the first gesture includes:

in response to determining that the first gesture satisfies the exposure trigger condition, generating instructions for causing at least one second icon to be displayed on the touch panel; and determining, at a moment when a third gesture directed at the at least one second icon is detected by the touch panel, and the first gesture is still detected by the touch panel, the at least one control parameter of the radiation source.

15. The system of claim 12, wherein the predetermined destination includes at least one of a first predetermined destination, a second predetermined destination, or a third predetermined destination, different destinations indicate different control parameters of the medical device.

16. The system of claim 15, wherein the first predetermined destination relates to the switch-on of a radiation source of the medical device, the second predetermined destination relates to a switch-off of the radiation source, and the third predetermined destination relates to an intensity of radiation signals emitted from the radiation source.

17. The method of claim 12, wherein during the movement of the patient bed, once the touch panel does not detect the first gesture and the second gesture, stopping the movement of the patient bed.

18. The method of claim 17, wherein in response to determining that the first gesture does not satisfy the first trigger condition, the touch panel remains original information displayed before detecting the first gesture or a notification reminding a user that the first gesture is invalid.

19. The method of claim 18, wherein the at least one icon is displayed around the first gesture with the first gesture as a centre.

20. The method of claim 19, wherein the at least one movement parameter includes a movement speed of the patient bed, the movement speed relates to a distance between the second gesture and an edge of the touch panel, and the less distance between the second gesture and the edge of the touch panel, the greater the moving speed.

* * * * *